Feb. 23, 1932. A. W. SCHISLER 1,846,363
PROCESS FOR PRODUCING UNSATURATED HYDROCARBONS FROM WASTE RUBBER
AND WASTE COMPOUNDS CONTAINING RUBBER
Filed Nov. 7, 1928
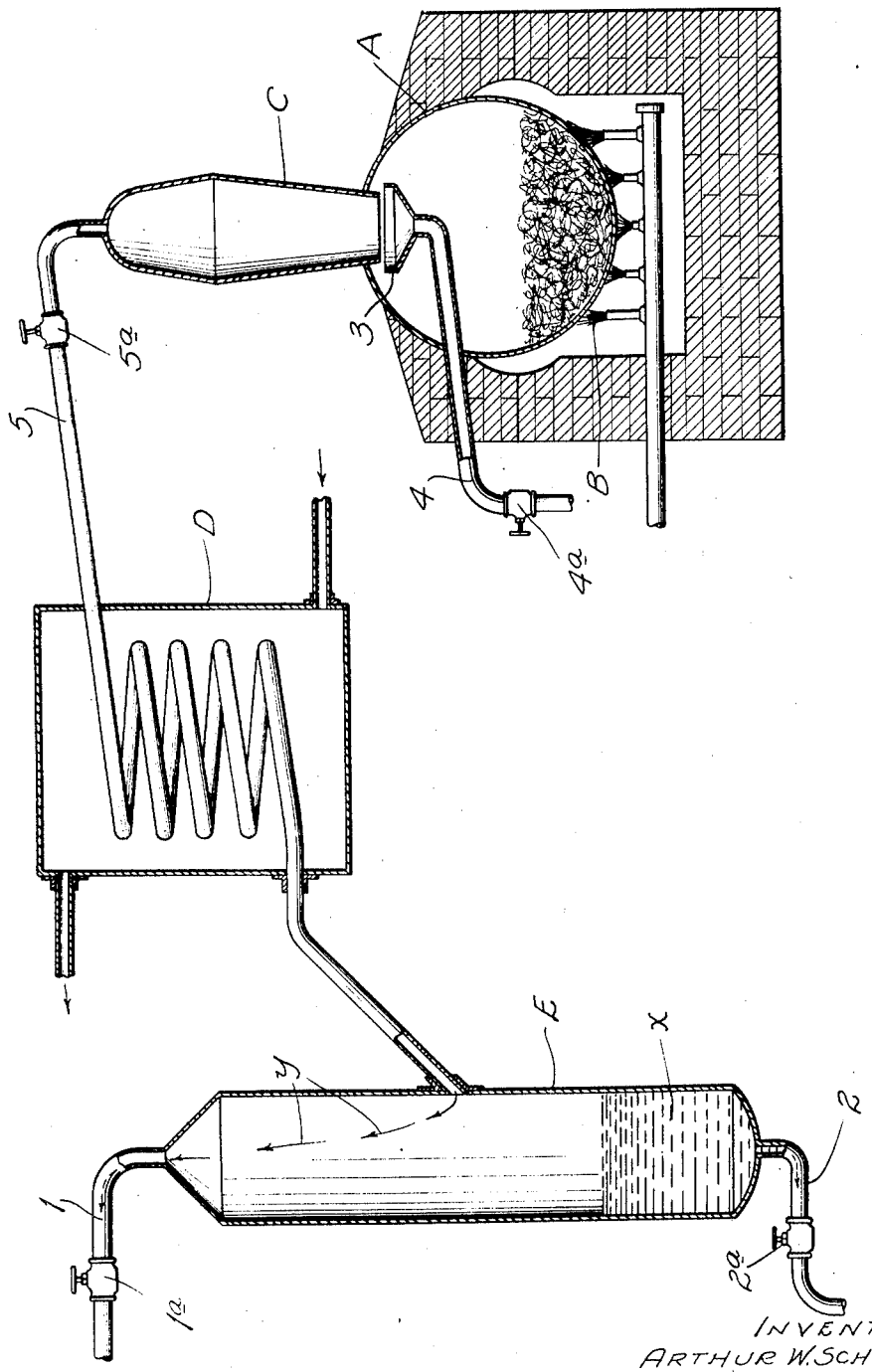
INVENTOR:
ARTHUR W. SCHISLER
BY Bakewell & Church
ATTORNEYS.

Patented Feb. 23, 1932

1,846,363

UNITED STATES PATENT OFFICE

ARTHUR W. SCHISLER, OF WEBSTER GROVES, MISSOURI

PROCESS FOR PRODUCING UNSATURATED HYDROCARBONS FROM WASTE RUBBER AND WASTE COMPOUNDS CONTAINING RUBBER

Application filed November 7, 1928. Serial No. 317,869.

This invention relates to the manufacture or production of unsaturated hydrocarbons.

One object of my invention is to provide a process by which valuable unsaturated hydrocarbons can be obtained at a low cost from waste rubber and waste compounds containing rubber.

Another object is to provide a process of the character referred to that will give high yields of unsaturated hydrocarbon gases and liquids, and which is capable of being practised or carried out in an apparatus of simple design. Other objects and desirable features of my invention will be hereinafter pointed out.

My process, briefly described, consists in subjecting waste rubber or waste compounds containing rubber to destructive distillation, so as to produce or obtain from same hydrocarbon gases of the ethylenic type, then subjecting said gases to a condensing operation or other suitable treatment, so as to cause the condensable vapors in same to be converted into unsaturated hydrocarbon liquids, and thereafter collecting and storing said unsaturated gases and unsaturated liquids in separate reservoirs or containers preparatory to subsequently treating the same to obtain valuable products from the same. The said recovered gases are capable of being used for various purposes, for example, in the production or manufacture of substances such as alcohols, aldehydes, ethers, esters, glycols, chlorhydrins, vinyl derivatives and the like, and the said recovered liquids are capable of being used in the various arts and industries and are particularly adapted for use in the manufacture of paints, lacquers and varnishes, on account of their exceptional solvent filming properties, and semi-drying properties.

My process is applicable to vulcanized and unvulcanized waste rubber and to waste products or compounds that contain rubber in admixture with cellulose matter, keratineaceous matter and other foreign matter. When the process is applied to waste rubber compounds, or materials that consist of vulcanized rubber mixed with a foreign substance such as cellulose, iron or a keratineaceous substance, it is preferable to subject the waste rubber material to destructive distillation in the presence of a depolymerizing or splitting agent consisting of a basic material or basic materials, that tend to promote and control the general unsaturated features of the resultant product or products of the process, and also act upon the sulfur present in the waste rubber material.

Various types and kinds of apparatus may be used to carry out my process, but it is preferable to use an apparatus which is of such design that the heavy, high boiling point vapors that are evolved in the distilling operation will be prevented from mixing with and thus contaminating the lower boiling point hydrocarbon gases that are evolved in the distilling operation.

The figure of the drawing is a diagrammatic view of an apparatus that I have used successfully for practising my process.

Said apparatus consists of an air-tight retor A, a source of heat B for said retort, a separating device C arranged in the path of travel of the escaping gases evolved in the distilling operation, a condenser D, and a separating chamber E connected with the discharge end of the coil of said condenser and provided with a gas outlet 1 that leads to storage space, and a liquid outlet 2 that leads to a separate storage space, the gas outlet 1 having a valve 1ª that is normally opened, and the liquid outlet 2 having a valve 2ª that is normally closed.

In practising my process the waste rubber material, after being assorted as to its properties, is placed in the retort A with or without a basic splitting agent of the kind referred to, depending upon the character or nature of the waste rubber material. For example, if the waste rubber material is free, or substantially free, from foreign substances, it is not absolutely necessary that a basic agent be placed in the retort with the rubber material, but if the rubber material consists of a compound or mixture of vulcanized rubber and a foreign substance or substances, it is preferable to introduce an alkaline material or some other suitable basic depolymerizing agent into the retort prior to the beginning of the distilling operation, as I have found that the addition of such an agent facilitates the removal of the high boiling point hydrocarbons evolved in the distilling operation and insures the recovery or production of a greater percentage of unsaturated hydrocarbon gases of the ethylenic type, together with a substantially uniform, highly unsaturated hydrocarbon oil. In the event a depolymerizing or splitting agent is used, the amount or quantity of this agent that is placed in the retort will vary, according to the quantity and character of the waste rubber material that is being distilled.

The mixture in the retort A is destructively distilled by heating said mixture gradually to a temperature varying from 100° C. up to 450° C., with the proper regulation of pressure. The gases and vapors evolved in this operation escape from the retort A through the separating device C., which is maintained at such a temperature that the high boiling point, or heavy vapors in said escaping gases will condense in the separating device C and fall into a trap 3 from which they are discharged at intervals by opening the valve 4$^a$ of a discharge pipe 4, thereby effectively preventing such heavy vapors from becoming mixed with and thus contaminating the products of the distillation. The lower boiling point hydrocarbon gases, together with the condensable vapors that are mixed with same, escape from the upper end of the separating device C through an eduction pipe 5 that communicates with the upper end of the coil of the condenser D, wherein some of said gases and vapors condense to form an unsaturated hydrocarbon oil $x$ that collects in the separating chamber E. The gases indicated by the arrows $y$, that enter the separating chamber E from the condenser D, escape from the upper end of said chamber through the gas outlet 1 and pass to a reservoir or container, wherein they are stored until they are to be used in the manufacture of the products for which they are adapted. The liquids that collect in the chamber E are withdrawn from the same through the liquid discharge pipe 2, and confined in a reservoir or container until they are to be used for the purpose for which they are adapted. By increasing the temperature of distillation, and the pressure under which the retort is maintained, a larger volume of gaseous products is obtained.

One specific example of my process is as follows:

A waste rubber compound consisting of vulcanized rubber intimately mixed or combined with a cellulose material and metal, is placed in the retort A together with sodium hydroxide, in the approximate proportions of 500 lbs. of waste rubber material to 25 lbs. of sodium hydroxide. This mass or mixture is then heated gradually to a temperature of about 250° C. for a period varying from two to three hours. At a temperature of about 100° C. a fog starts to come off the mixture being distilled, and I then open the valve 5$^a$ in the eduction pipe 5 leading from the separating device C, so as to permit said vapor to pass to the condenser D. At about this temperature an aqueous liquid of an ammoniacal nature is recovered from the condenser with a slight amount of oil and gas. As the temperature gradually increases, the recovery of said aqueous liquid lessens and the production of gas and oil increases. This increase continues until an approximate temperature range of from 250° C. to 350° C. is reached, after which the volume of gas increases and the volume of oil decreases.

The procedure above described will produce approximately 30 gals. of a valuable unsaturated hydrocarbon oil, approximately 3500 to 4000 ft. of a valuable unsaturated hydrocarbon gas, approximately 3 to 4 gals. of a tar-like substance, and approximately 3 to 5 gals. of an ammoniacal liquid. The residue that remains in the retort at the completion of the distilling operation, consists of carbonaceous matter mixed with basic material, iron, metal oxides, etc. Out of a series of several hundred tests that I have made to prove the practicability and commercial utility of my process, I have obtained the following approximate quantities of products per ton of waste rubber material, consisting of waste rubber scrap containing a general average of cellulose and keratinaceous matter:

(1) Highly unsaturated hydrocarbon (ethylenic type) gases, 10,000 to 20,000 cubic feet, depending upon the temperature and the splitting agent employed;

(2) Highly unsaturated hydrocarbon oil, 100 to 125 gals.;

(3) Ammoniacal liquor, 25 to 50 gals.;

(4) Metal, 300 to 400 lbs.;

(5) Tarry matter, 15 to 20 gals.; and (6) Carbonaceous matter and residue, 400 to 500 lbs.

In instances where the waste rubber material that was distilled contained little or no foreign matter, such as cellulose iron, etc., I have obtained yields of approximately 75% to 85%, by weight, of unsaturated hydrocarbon oil and also a greater percentage of unsaturated hydrocarbon gases than in instances where the rubber material that was distilled contained considerable foreign matter.

I will not attempt to enumerate the various uses for which the unsaturated hydrocarbon gases and oils constituting the two principal products of my process are adapted. Nor will I herein describe the procedure that is used to convert said gases and oils into commercial substances or materials. My present invention consists of a process for obtaining such unsaturated hydrocarbons from waste rubber and waste compounds containing rubber, and accordingly, it is immaterial how said products are subsequently treated to render them suitable for commercial use, or to extract valuable substances from the same.

Having thus described my invention, what I claim as new and desire to secure by Letters Patent is:

1. A process for producing unsaturated hydrocarbons, consisting in subjecting waste rubber or waste compounds containing rubber, to destructive distillation in the presence of a basic agent so as to produce unsaturated hydrocarbon gases of the ethylenic type, converting the condensable vapors mixed with said gases to an unsaturated hydrocarbon liquid, and thereafter utilizing or conserving for use, said unsaturated hydrocarbon gases and liquid.

2. A process for producing unsaturated hydrocarbons, which consists in distilling waste rubber or waste compounds containing rubber, in a retort, in the presence of a basic agent capable of depolymerizing the rubber molecules at a temperature high enough to produce unsaturated hydrocarbon gases, then subjecting said gases to a condensing operation so as to cause the condensable vapors to be converted into unsaturated hydrocarbon liquid, and thereafter storing or confining said liquid and said uncondensable gases in separate reservoirs or containers.

3. A process, which consists in destructively distilling in the presence of a basic agent and at a temperature of approximately 450° C., waste rubber or waste compounds containing rubber, thereby producing unsaturated hydrocarbon gases of the ethylene type, then passing the gases and vapors evolved in the distilling operation through a condenser, and thereafter storing or conserving for subsequent use, the unsaturated liquids and gases discharged from the condenser.

4. A process for producing unsaturated hydrocarbons, consisting in subjecting waste rubber or waste compounds containing rubber, to a high temperature in a closed retort that is maintained under a pressure and which contains a basic agent, thereby causing unsaturated hydrocarbon gases of the ethylenic type to be evolved from said rubber material, preventing the high boiling point vapors from becoming mixed in substantial quantities with the lighter or lower boiling point gases and vapors, passing said lower boiling point gases and vapors through a condenser, and storing or confining in separate spaces the liquids and the gases that escape from the condenser.

ARTHUR W. SCHISLER.